United States Patent [19]
Yuen

[11] Patent Number: 5,583,417
[45] Date of Patent: Dec. 10, 1996

[54] POWER SHARING DETECTOR FOR USE WITH A BATTERY CHARGER AND AN AUXILIARY DEVICE

[75] Inventor: Tang K. Yuen, Singapore, Singapore

[73] Assignee: SGS-Thomson Microelectronics PTE Ltd., Singapore, Singapore

[21] Appl. No.: 191,001

[22] Filed: Feb. 3, 1994

[30] Foreign Application Priority Data

May 5, 1993 [GB] United Kingdom ............... 9309176
May 5, 1993 [GB] United Kingdom ............... 9309177

[51] Int. Cl.$^6$ ............................................. H01M 10/46
[52] U.S. Cl. .................................... 320/22; 307/39
[58] Field of Search ............................. 320/22, 23, 24, 320/27, 39, 40, 10, 11, 9; 307/31, 32, 39

[56] References Cited

U.S. PATENT DOCUMENTS

| | | | |
|---|---|---|---|
| 5,122,722 | 6/1992 | Goedken et al. | 320/22 |
| 5,130,634 | 7/1992 | Kasai | 320/22 |
| 5,157,269 | 10/1992 | Jordan et al. | 307/59 |
| 5,317,249 | 5/1994 | Ford | 320/22 X |
| 5,325,040 | 6/1994 | Bogut et al. | 320/22 |
| 5,489,836 | 2/1996 | Yuen | 320/32 |

FOREIGN PATENT DOCUMENTS

| | | |
|---|---|---|
| 0479249 | 4/1992 | European Pat. Off. . |
| 0479248 | 4/1992 | European Pat. Off. . |
| 2260231 | 4/1993 | United Kingdom . |
| 2261124 | 5/1993 | United Kingdom . |

*Primary Examiner*—Edward H. Tso
*Attorney, Agent, or Firm*—Felsman, Bradley, Gunter & Dillon, LLP

[57] ABSTRACT

A technique for detecting power demand to provide efficient power sharing. The technique is particularly but not exclusively concerned with providing a power sharing detector for use in a portable computer which requires battery charging to be done concurrently with computer usage, and preferably provides three different rates of charging. A power sharing detector is provided for use with this technique. The power sharing detector is used in a circuit which has a power supply which supplies power both to an auxiliary device and a battery charger. The detector has a voltage detection circuit which is connected to receive a voltage representative of the power supplied to the auxiliary device and to determine therefrom a state of the auxiliary device. The detector also has means for selecting one of two charging rates for charging a battery in dependence on the voltage detected by the voltage detection circuit whereby a lower charging rate for charging the battery is selected when it is determined that said auxiliary device is in an on state so that the total power required by the auxiliary circuit and the battery charger does not exceed the maximum power which the power supply can provide.

17 Claims, 13 Drawing Sheets

FIG. 2 (CONTD)

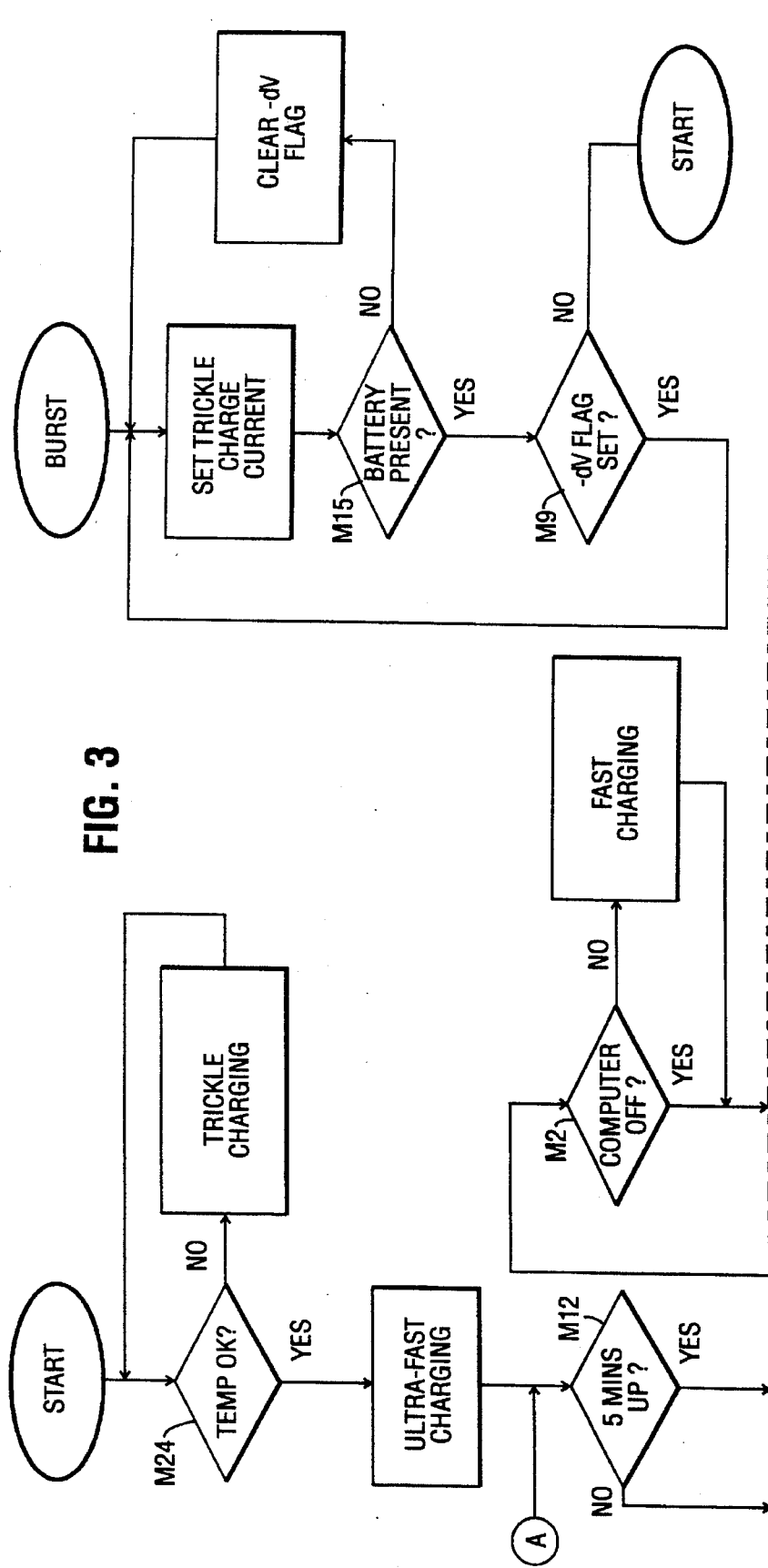

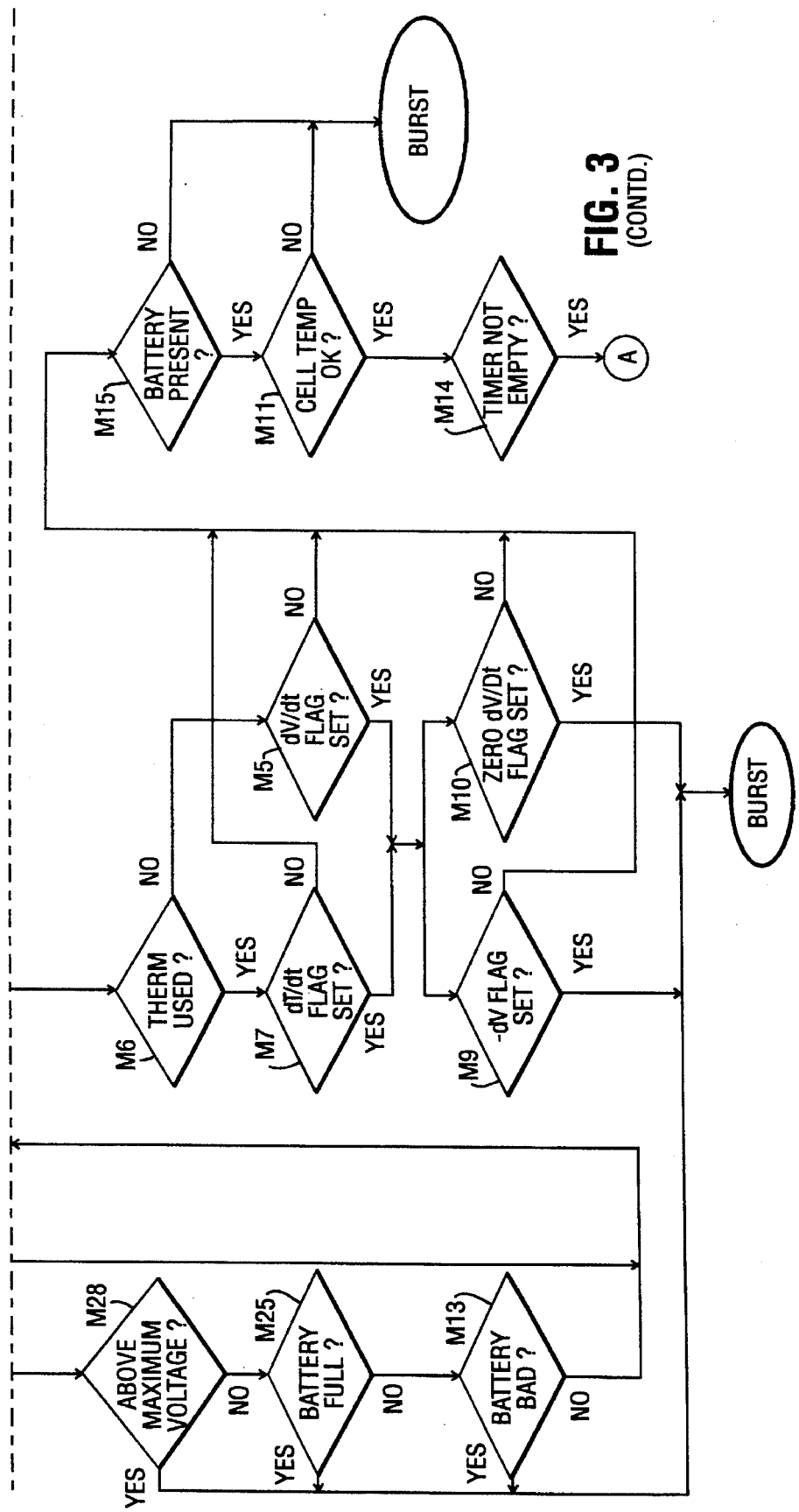
FIG. 3 (CONTD.)

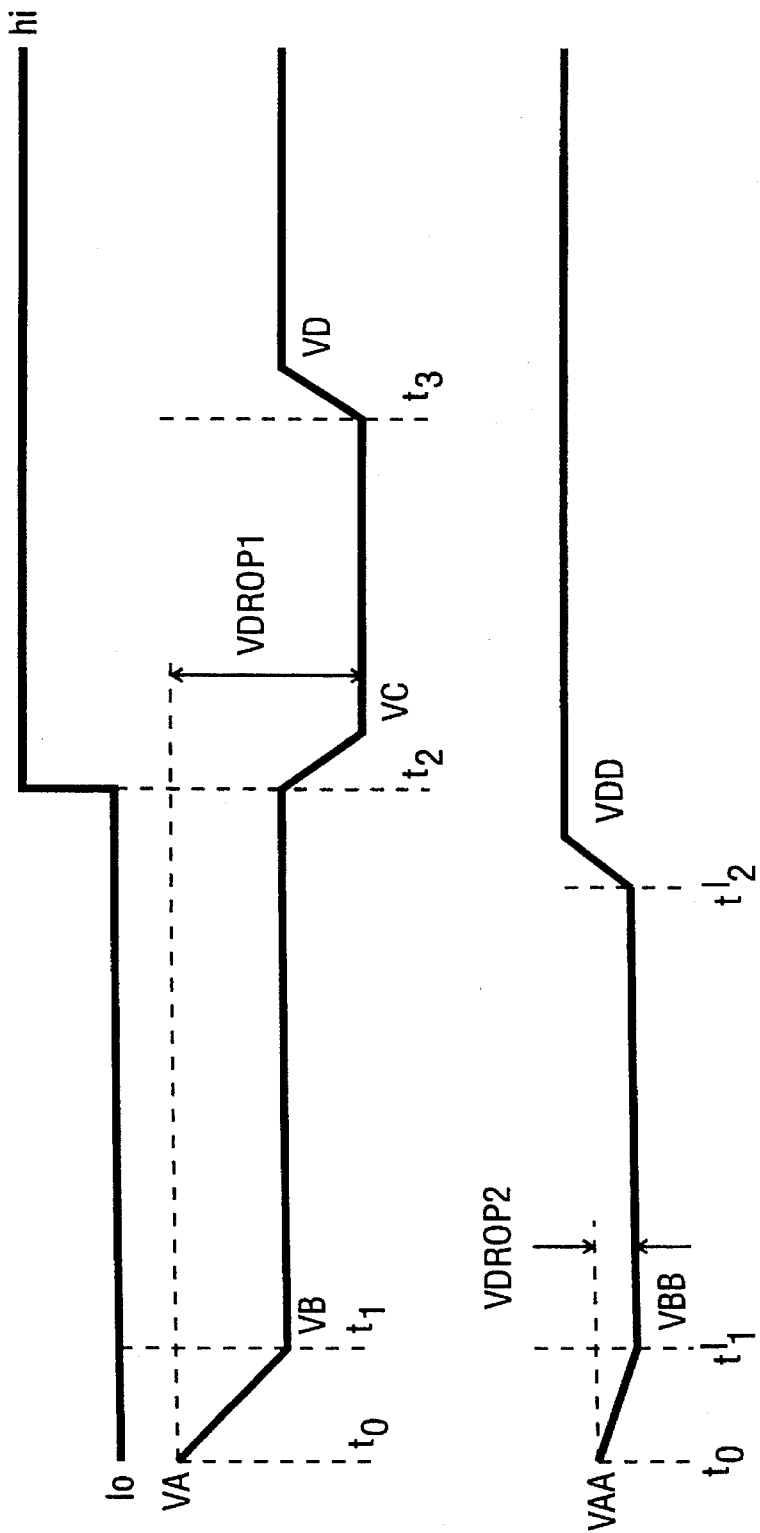

POWER SHARING DETECTOR FOR USE WITH A BATTERY CHARGER AND AN AUXILIARY DEVICE

FIELD OF THE INVENTION

The present invention relates to a power sharing detector for detecting power demand to provide efficient power sharing.

BACKGROUND TO THE INVENTION

The present invention is particularly but not exclusively concerned with providing a power sharing detector for use in a portable computer which requires battery charging to be done concurrently with computer usage.

FIG. 1 is a block diagram of a battery charging system for such an application. It shows the basic structure of a switch mode power supply and battery charger for a portable computer in block diagram form. Mains power is converted from its ac form at a supply Y8 into a dc form along line Y7 to be fed to a battery via a constant current charger Y2 and to an auxiliary output AO which is for connection to a computer.

If power is needed by the charger Y2 for charging a battery pack Y4 connected to the charger Y2 and at the same time power is required to be supplied via the auxiliary output AO to the computer, the total power needed must be supplied from the supply Y8 via the power supply converter components Y1,Y6,Y17 and Y5. Thus, the result is that the power supply converter components must be designed to match the maximum possible power demanded from it.

For example, if the computer utilises 25 W at the peak of its operation and the maximum power needed for battery charging at its fastest rate is 20 W, the power supply converter has to be designed for 45 W, assuming lossless power conversion. However, at times when charging is done without the computer being used, then the power supply converter is under utilised.

If a power sharing concept is used, the power supply converter can be designed for only 35 W but can still meet both power demands. For example, the charger can be designed to perform two rates of charging, one for the original rate, requiring 20 W, and another, slower rate at 10 W. In this way, during charging using the faster rate of 20 W, when the computer is suddenly turned on, this can be detected by a charge controller and the charger can thus be switched to the slower charging rate of 10 W, thereby releasing 10 W of extra power for computer usage. Thus, 10 W will be used for battery charging and 25 W will still be available for computer operation. One known way for detecting the on/off state of the computer to implement power sharing is to detect the state of a computer on/off switch. This method of detection has two drawbacks. Firstly, since the charger controller is required to read the state of the computer on/off switch, they have to be close together, thus possibly limiting the charger controller to be designed within the computer. Secondly, whenever the computer is turned on, the charging rate is halved no matter how much actual power is being demanded by the computer. For example, the computer may be only drawing 4 to 5 W of power which the power converter could easily handle with the faster rate of battery charging. This means that the power converter is not always utilised to its optimum capacity.

Another known method is to have a signal coming from a central processor of the computer to indicate computer operation. However, this means that a line has to be run from the central processor to the charger, again limiting the location of the charger controller to be near to the central processor unit. Also it has the same inefficiency problem as the previous method and presents an extra task for the central processor to perform.

SUMMARY OF THE INVENTION

According to the present invention there is provided a power sharing detector for use in a circuit comprising a power supply connected to supply a battery charger and an auxiliary device, the power sharing detector comprising a voltage detection circuit connected to receive a voltage representative of the power supplied to the auxiliary device and to determine therefrom the state of the auxiliary device; and means for selecting one of two charging rates for charging a battery in dependence on the voltage detected by the voltage detection circuit.

The auxiliary device can be a computer or a second battery charger.

Thus, a power supply converter coupled to the power supply can be allowed to operate up to its maximum capacity. Furthermore, by detecting the voltage representative of power supplied to the auxiliary device, the voltage detection circuit can be located at any point along the supply line to the auxiliary device and does not have to be located close to it.

The present invention can operate to detect a reduction in voltage due to an auxiliary device being turned on while the charger is operating.

Furthermore, if the computer is already switched on before charging commences at the faster rate, the present invention can be arranged to detect a resulting voltage drop to switch the charger to the slower rate. Thus, in the preferred embodiment, either one of two conditions can be detected to cause charging to be switched to a slower rate.

For a better understanding of the present invention and to show how the same may be carried into effect, reference will now be made by way of example to the accompanying drawings.

BRIEF DESCRIPTION OF THE DRAWINGS

FIG. 3 is a flow chart illustrating the sequence of operation of the battery charger controller;

FIGS. 9a, 9b and 9c are time charts illustrating a power sharing concept;

Figure 1:
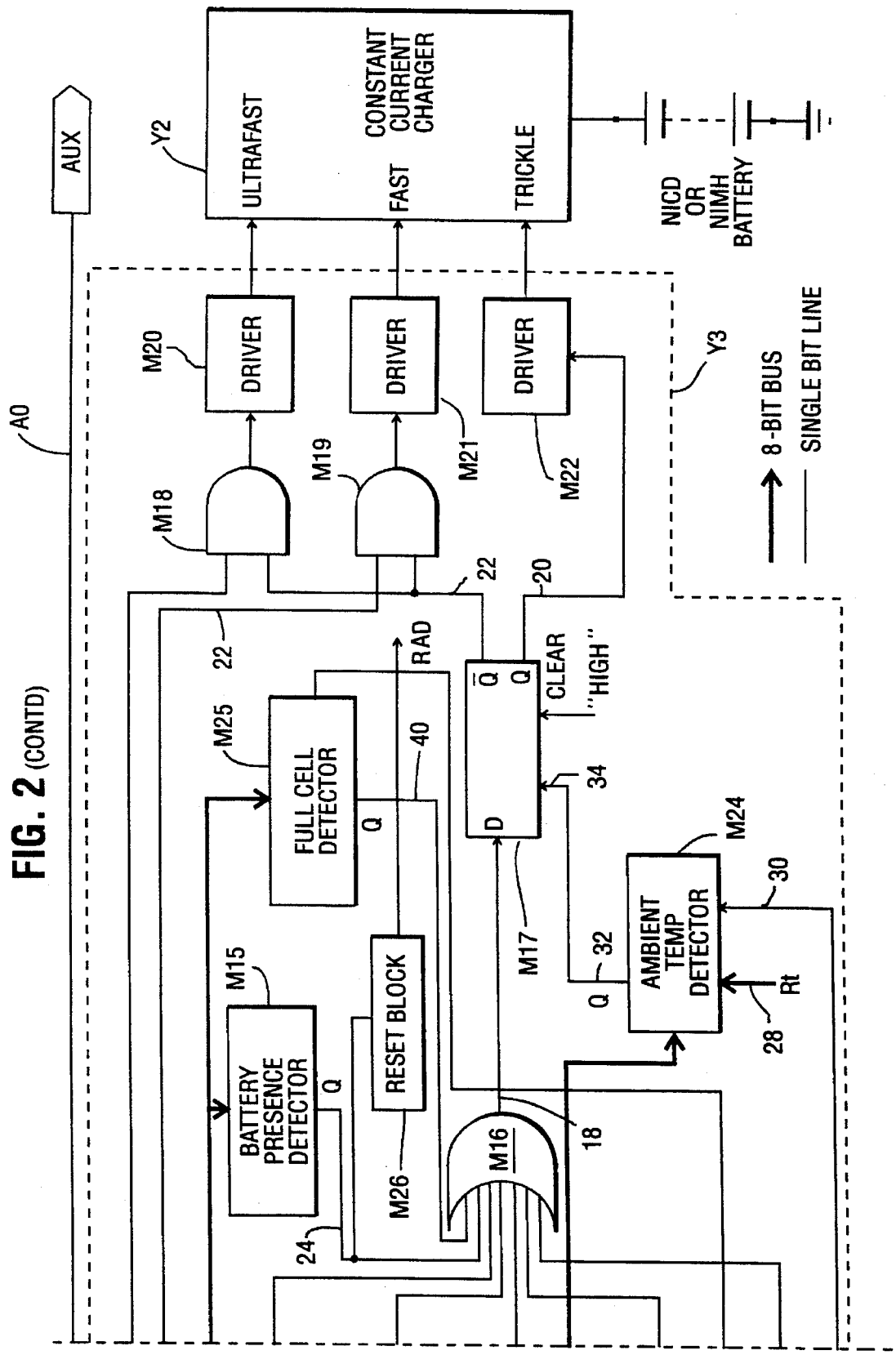
FIG. 1 is a block diagram of a battery charging system.

However, if a battery is subsequently reconnected to the battery terminal, the battery presence detector M15 will detect its presence and reset its Q output 24 to a "low" level. This negative going transition will trigger a reset circuit M26 to reset all detectors in the battery charger controller Y3 by a signal RAD at its output for a fresh detection cycle. This enables new packs of batteries to be charged upon replacement without the need for power reset.

The flip-flop M17 is normally reset to enable ultra-fast or fast charging, enabling drivers M20 and M21 and disabling driver M22 upon power-up, provided the ambient temperature in the battery pack Y4 before the start of charging falls within a temperature window. This temperature window is set by a range defined by a lowest and highest value, for example, 0° C. and 40° C. respectively. The reason is that if the ambient temperature around the battery pack Y4 is outside this range, it is not advisable to have ultra-fast or fast charging of the battery due to charge efficiency and safety reasons. This ambient temperature comparison is done by an ambient temperature detector M24 receiving the temperature range Rt at its input 28. The detector M24 is enabled on power-up by a signal at its enable input 30. If the temperature is within range, the detector M24 will output on its Q output 32 a "high" signal to a set pin 34 of the flip-flop M17. After this the Q and $\overline{Q}$ outputs 20,22 of M17 will be determined by the states of any one of eight detection circuits M9,M10,M11,M13,M14,M15,M25 or M28, that is a "high" signal from the outputs of any one of these circuits will inhibit ultra-fast or fast charging and enable trickle charging.

Detection circuits M9,M10 and M15 have been described above. M11 denotes a maximum temperature detector which samples the digital form of the cell temperature during charging from the Temp input via the ADC channel and filter M4. The maximum temperature detector M11 will set a Temp flag at its Q output 38 if its input exceeds a certain maximum value Tmax set internally. This maximum value Tmax could be in the range of 50° to 60° C. Above this temperature (by 1° C. or more) it is not advisable to charge the battery using a high current due to charge efficiency and safety reasons. The setting of the Temp flag on line 38 will set the flip-flop M17 thereby switching the charging rate to the trickle mode.

During the initial 3 to 5 minutes of the charging cycle, the rate of change of the battery voltage at terminal $V_{batt}$ is monitored by a full cell detector circuit M25. Since for an already charged battery its voltage rises rapidly for the first few minutes of recharging, this occurrence can be detected by the circuit M25 to indicate a "full" battery. Thus a "high" signal is generated at its Q output 40 which sets the flip-flop M17 via the gate M16. The time frame used to set the initial period for this "full" cell detection is generated by a one-shot timer M12 which is triggered by the Power-on signal from the Power-on terminal.

There is also a maximum voltage detector M28 which measures the battery voltage during the initial few minutes of the charging cycle and cuts off charging if its value exceeds a maximum voltage reference $V_{max}$, as the battery is most likely a "full" one. This is done by its Q output 44 going high and being supplied to the gate M16 via a gate M29. The time frame used for this detection is also taken from the one-shot timer M12, connected to the enable input 42 of the maximum voltage detector M28. By detecting fully charged batteries during the initial portion of the charge cycle by detectors M25 and M28, unnecessary charging can be avoided and also the battery is better protected against overcharging.

During the same time frame set by the one-shot timer M12 as mentioned above, a faulty cell detector M13 also operates. After this preset time frame during which ultra-fast or fast charging is in progress, the detector M13 will measure the battery voltage and if it is below a certain minimum level $V_{min}$, its Q output 46 goes "high" and the flip-flop M17 is set.

Finally, there is a count-down timer M14 which starts counting down after receiving the power-on signal at its input 48 and sets the flip-flop M17 via its Q output 50 through gate M16 when its content is decremented to zero. Both this timer M14 and the maximum temperature detector M11 are important to terminate charging in cases when the main detection methods (dV/dt M5, dT/dt M7, –dV M9 and zero dV/dt M10) fail, so as to ensure the survival of the battery pack at the high charging current.

M27 denotes a clock circuit which generates clock signals for each charging cycle. All readings are taken once every charge cycle.

FIG. 3 is the flow chart of the operation inside the described battery charger circuit.

After power-on but before charging starts, the cell temperature is measured in the ambient temperature detector circuit M24. If it falls outside the temperature window Rt (0° C. to 40° C., as mentioned before) trickle charging M22 will take place until it falls back to within range. If cell temperature is within range, ultra-fast charging M20 will be done.

During the first few minutes of charging set by the one-shot timer M12 the battery voltage is measured by circuit M28. If it exceeds a certain level per cell, this indicates that the battery is already fully charged so that high current charging is unnecessary. Ultra-fast charging will be terminated and replaced with a trickle charge (in the "burst" mode). In addition the rate of change of battery voltage is also monitored by full cell detector M25 within the same time frame. If a certain threshold is exceeded, indicating also a "full" cell condition, ultra-fast charging is stopped, and the trickle charge "burst" mode is entered.

The battery level is also checked during the same period by M13 for faulty conditions. If the battery is found to be faulty, ultra-fast charging is stopped, and the trickle charge "burst" mode is entered. After the first few minutes determined by the one-shot timer M12, no checking will be done for maximum voltage level, faulty voltage level and "full" cell detection.

Next the computer connected to the AO line (FIG. 1) is checked for its on/off status by the power sharing detector M2 to decide whether to continue with ultra-fast charging or switch to fast charging.

The battery is then checked for the inclusion of a thermistor Y9 at block M6. If a thermistor is used, dT/dt (rate of change of cell temperature) is measured at block M7. If a thermistor is not used, dV/dt (rate of change of battery voltage) is measured at block M5. At these two blocks the dT/dt or the dV/dt is monitored for the pre-measurement phase and the respective flags set accordingly when detection occurs.

The setting of either the dT/dt or dV/dt flag completes the pre-measurement phase and opens the gate for the final end-of-charge detection at M9 (for detection of setting of −dV flag) and M10 (for detection of the setting of the zero dV/dt flag) concurrently. Setting of either the −dV flag or zero dV/dt flag will complete the end-of-charge detection, after which charging will be replaced with the "burst" mode (trickle charge).

If the battery is not near to the end-of-charge point yet, a scan time follows during which the battery presence detection (by M15), cell temperature detection (by M11) and charging time detection (by M14) are done. If the battery is removed, charging is stopped and the "burst" mode (trickle charging) takes over. In the "burst" mode, the battery contacts are continuously scanned and if a battery is reconnected, the whole charge cycle is repeated.

If cell temperature exceeds a maximum value Tmax, high current charging will be stopped and will be replaced with the "burst" mode. Similarly if the internally set timer M14 counts down to zero before any other detection is made, ultra-fast/fast charging is also stopped. Otherwise the whole charging cycle will repeat itself from point "A" until terminated by the "burst" mode.

In the "burst" mode, the trickle charge current is set, M22. The battery presence detector M15 detects if a "full" battery is removed and replaced with another pack. In that event, charging will restart from the beginning without the need for any power down and up again procedure. Otherwise, once in the "burst" mode, the charge cycle will remain in that mode until the power-on reset is applied again.

Figure 4:
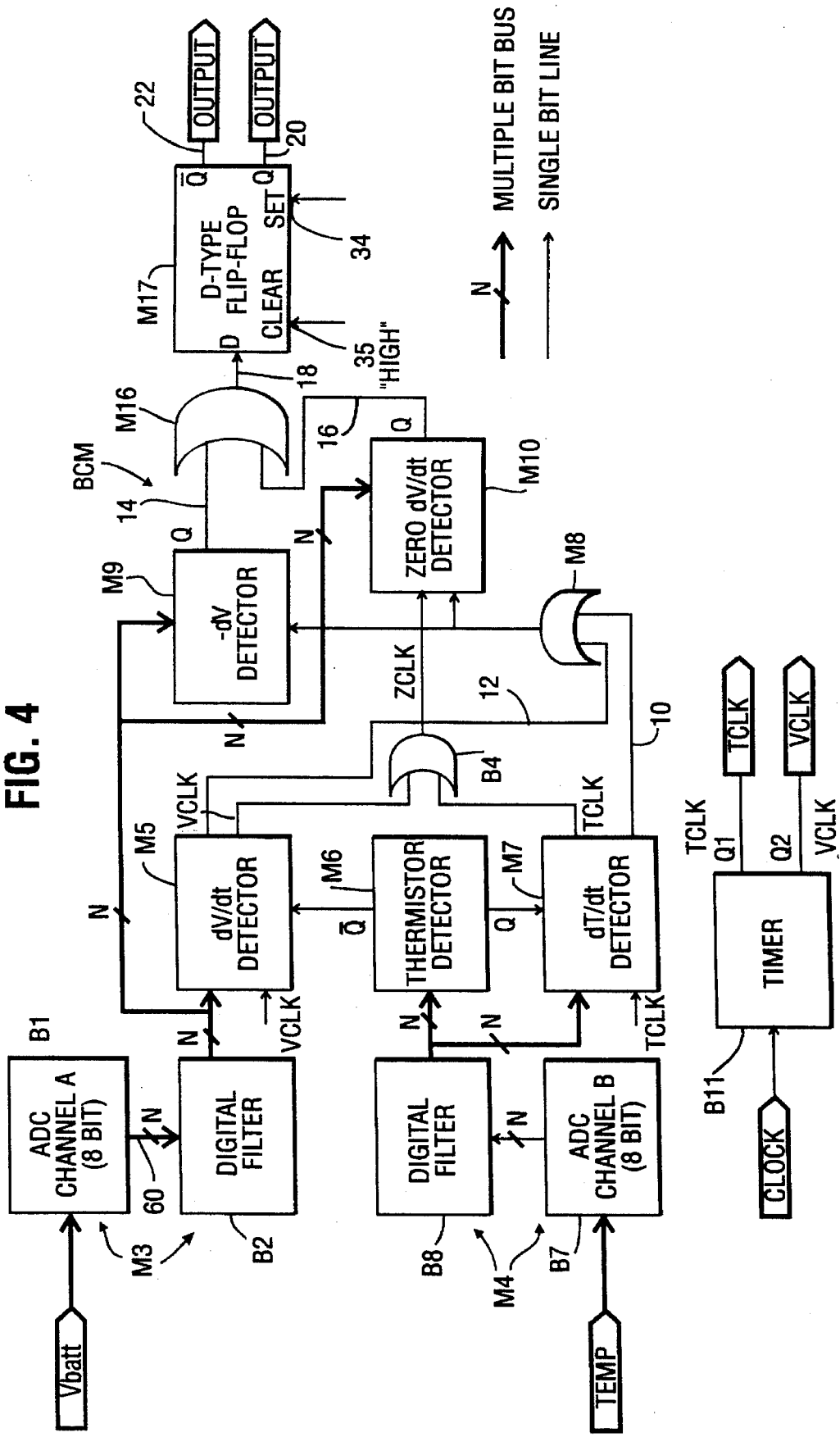
FIG. 4 is a block diagram of those components forming the battery charger monitor.

FIG. 4 is a block diagram of a battery charger monitor BCM. The battery charger monitor BCM comprises the ADC channel and filter M3 connected to the battery voltage input terminal $V_{batt}$, the ADC channel and filter M4 connected to the cell temperature input Temp, the dV/dt detector M5, the thermistor detector M6, the dT/dt detector M7, the gate M8, a further gate B4, the −dV detector M9 and the zero dV/dt detector M10. The gate M16 is shown in FIG. 4, but only two of its inputs are illustrated. The gate M16 is shown connected to the flip-flop M17. FIG. 4 also shows a timer B11 which receives a clock signal Clock from the clock M27 in FIG. 2 and produces outputs Tclk and Vclk. There now follows a more detailed description of the operation of the battery charger monitor BCM. It will be appreciated that FIG. 4 shows the ADC channels and filters M3 and M4 each as two components, namely an ADC channel B1,B7 respectively and a digital filter B2,B8 respectively.

The battery voltage is measured at the $V_{batt}$ terminal and converted from its analog form to a digital form by one channel of the analog-to-digital converter B1. The digital value is then fed into the simple digital filter B2 for filtering, through an 8-bit bus 60.

Similarly the cell temperature is measured through the Temp terminal and fed into another channel of the analog-to-digital converter B7 and filtered by the digital filter B8. The thermistor detector M6 samples the 8-bit information from the filter B8 and determines whether a thermistor Y9 is being used or not. If yes, the dT/dt detector, M7, will be enabled and the dV/dt detector, M5, disabled. If otherwise, M5 will be enabled and M7 disabled.

Figure 5:
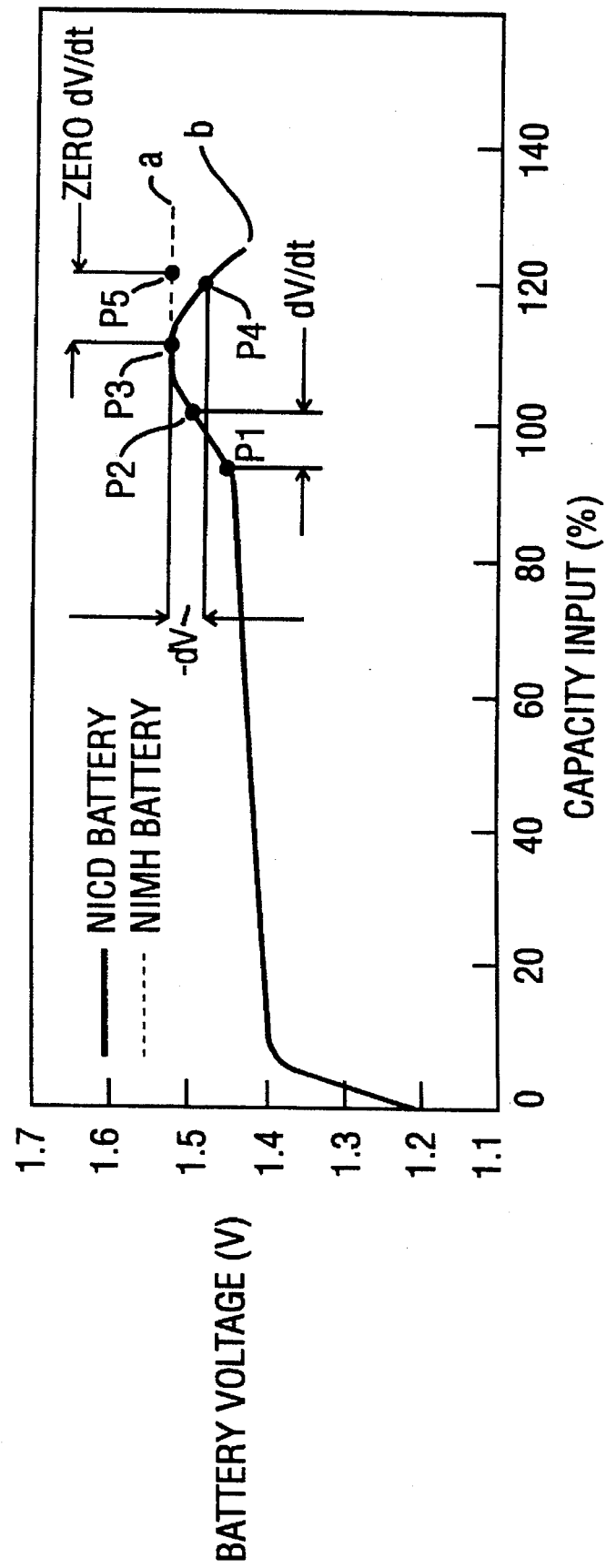
FIG. 5 is a graph of voltage against capacity indicating the characteristics of NIMH(a) and NICD(b) cells.
Figure 6:
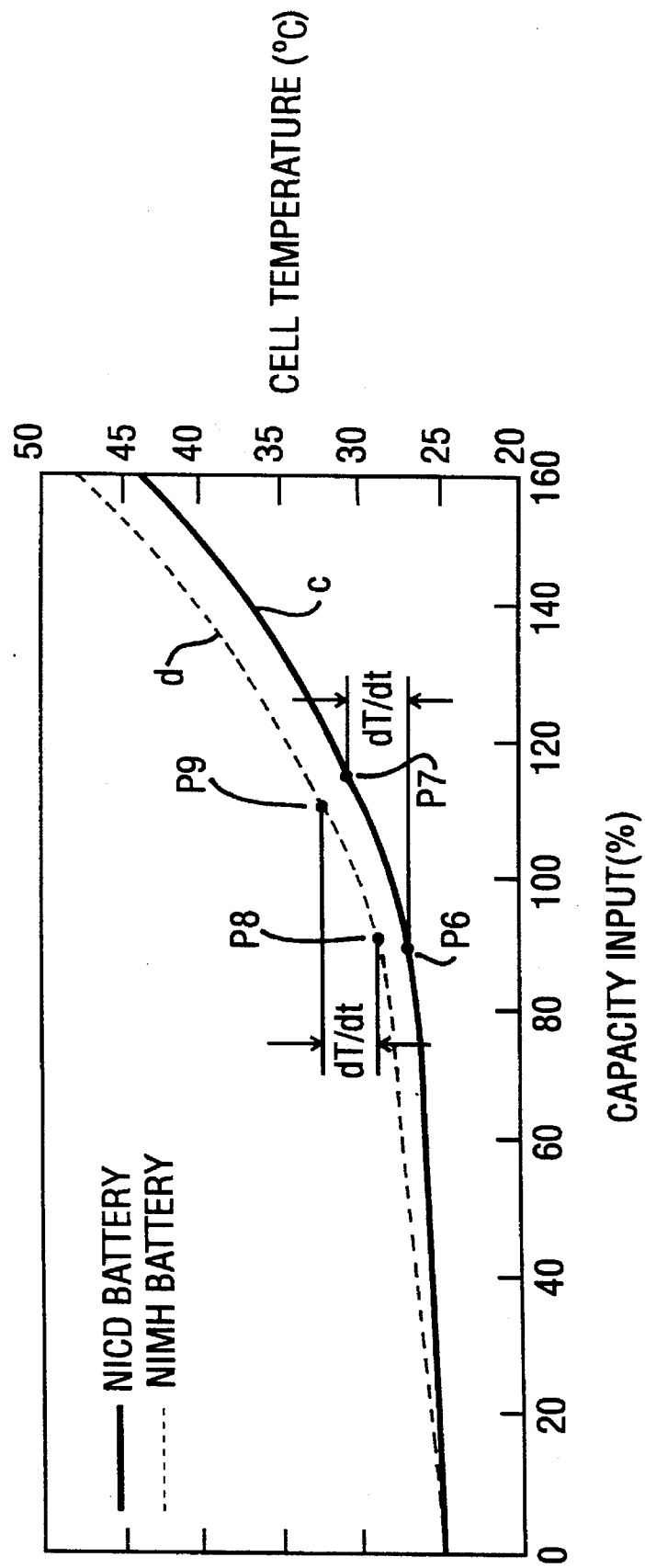
FIG. 6 is a graph of temperature against capacity indicating the characteristics of NIMH(d) and NICD(c) cells.

If the dV/dt detector M5 is enabled, it will monitor the gradient (dV/dt) of the voltage charging curve which is as illustrated in FIG. 5. As can be seen in FIG. 5, there is a substantial increase in the gradient between points P1 and P2 and this causes a dV/dt flag to be set. If the dT/dt detector M7 is enabled it will similarly monitor the gradient (dT/dt) of the temperature curve as illustrated in FIG. 6 until it detects a sharp increase in gradient, between points P6 and P7 on curve c for a NICD battery or points P8 and P9 on curve d for a NIMH battery when it will set a dT/dt flag. The gradient is monitored by making sequential measurements of voltage or temperature at interval durations (e.g. between points P1 and P2 in FIG. 5) generated by the timer B11. $T_{clk}$ sets the interval duration for dT/dt measurements and $V_{clk}$ sets the interval duration for dV/dt measurements.

When one of the dV/dt and the dT/dt flags is set, the −dV detector M9 and the zero dV/dt detector M10 are simultaneously activated, through the gate M8, enabling −dV (voltage drop) and zero dV/dt (voltage level) measurements to be taken concurrently. At this stage battery voltage measurements (through the 8-bit bus from the filter B2) are taken by the −dV detector M9 at one second intervals to monitor any negative voltage drop. Once this drop is detected (points P3 and P4, FIG. 5b) a −dV flag is set. This indicates an end-of-charge condition in an NICD battery.

At the same time the battery voltage slope is monitored between points, the interval of which is set by a clock signal $Z_{clk}$. $Z_{clk}$ is a clock signal derived from the gate B4, the inputs of which come from the dV/dt detector M5 ($V_{clk}$) or the dT/dt detector M7 ($T_{clk}$) depending on which of these circuits is enabled for pre-measurements. Once no change in voltage has been detected between points P3 and P5 in FIG. 5, the zero dV/dt flag will be set, due to a flat voltage slope in this region. This indicates an end-of-charge condition in an NIMH battery.

Once the −dV flag or the zero dV/dt flag is set, a "high" level will be available at the D input 18 of the flip-flop M17 through the gate M16. This "high" level will be transferred to the Q output 20 of M17 at the next clock pulse to enable trickle charging. The $\overline{Q}$ output 22 of the flip-flop M17 will be held "low" to disable ultra-fast or fast charging. At this point the battery pack is deemed full and only a low capacity trickle charge is required, for maintenance, to replenish self-discharging of the cells.

At start-up, the set pin 34 of the flip-flop M17 will be held "low" and the clear pin 35 held "high" (always) to disable ultra-fast or fast charging ("low" at the $\overline{Q}$ output 22 and "high" at the Q output 20) no matter what signal is available at the D input 18. Once the enable signal (a "high" level) arrives at the set pin 34, the high current charging (ultra-fast or fast mode) is activated ("high" at the $\overline{Q}$ output and "low" at the Q output) until detection is made by the −dV detector M9 or the zero dV/dt detector M10, after which trickle charging will take over.

Figure 7:
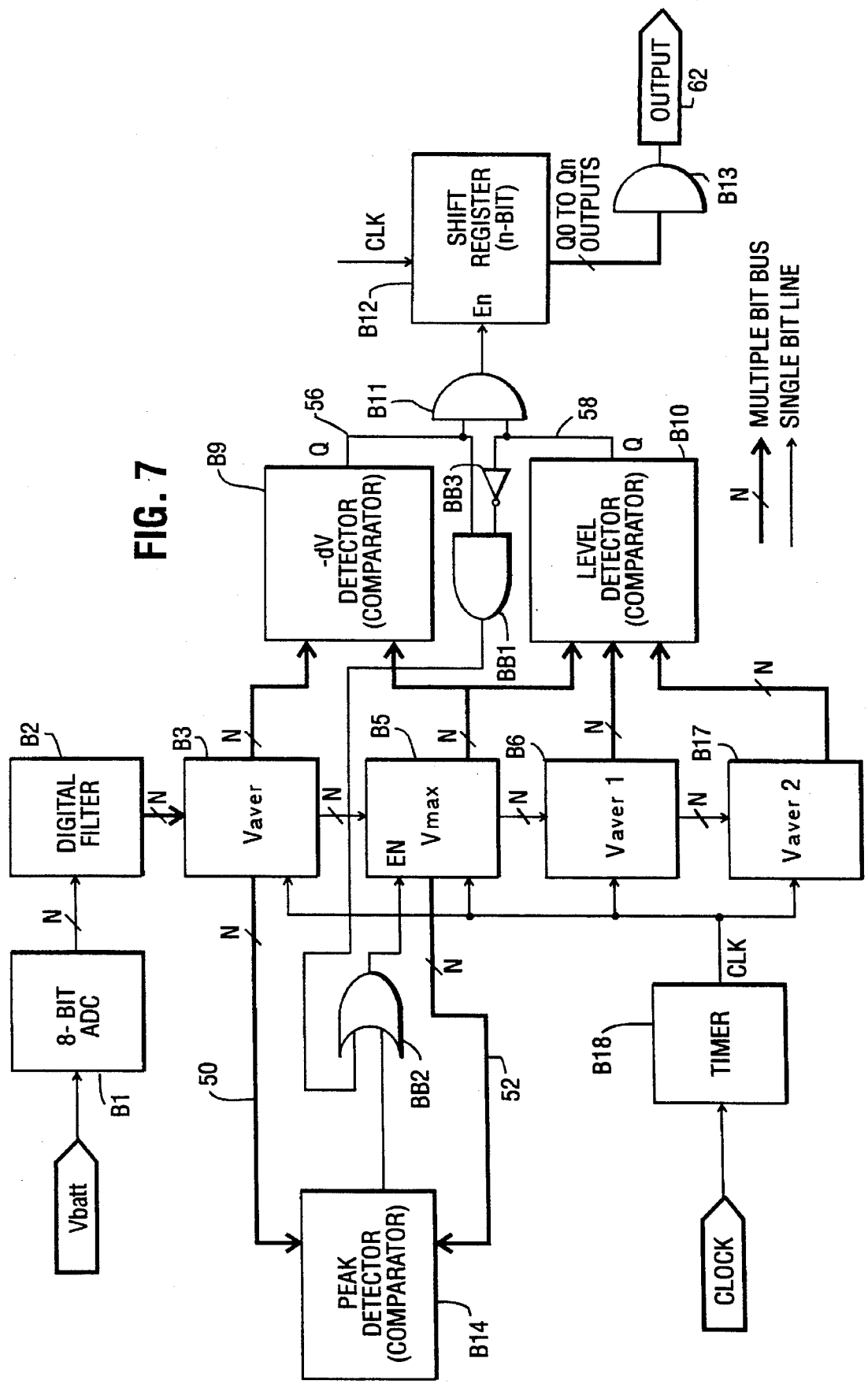
FIG. 7 is a block diagram of a negative (–dV) voltage detector.

FIG. 7 is a circuit diagram for the negative (−dV) detector M9.

As described above with reference to FIG. 4, the battery voltage at terminal $V_{batt}$ is fed into the analog-to-digital converter (ADC) B1. In the ADC, the battery voltage is converted from an analog form into a digital form and fed into the digital filter B2. After filtering, the 8-bit information is then stored in a $V_{aver}$ register B3. A plurality of registers B5,B6,B17 are connected to sequentially receive filtered voltage values. The $V_{aver}$ register B3 is connected to a $V_{max}$ register B5, which is connected to $V_{aver1}$ register B6 which is connected to $V_{aver2}$ register B17.

Figure 2:
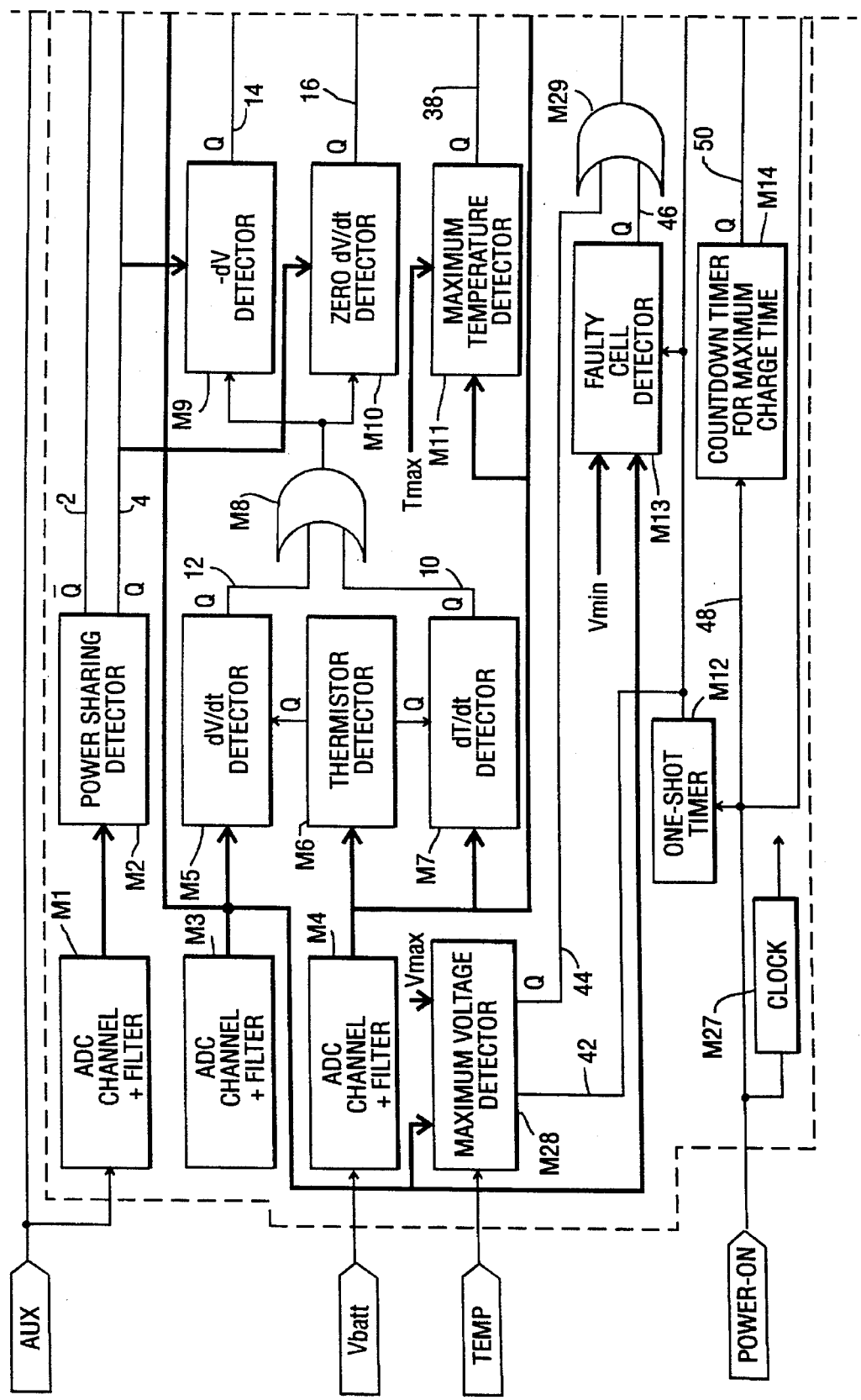
FIG. 2 is a circuit diagram of a battery charger controller.

All the registers B3,B5,B6 and B17 are clocked by a signal clk from a timer B18 which takes its input from clock M27 in FIG. 2. The signal clk has the same frequency as the measurement cycle (the frequency at which battery voltage measurements are taken). On the first clock pulse, data in the register B3 is shifted into B5, with the latest battery voltage data being stored in B3. On the next cycle, the data is clocked through so that the contents of B5 are shifted into B6, the contents of B3 into B5, etc. Thus after four cycles all the registers $V_{aver}$ (B3), $V_{max}$ (B5), $V_{aver1}$ (B6) and $V_{aver2}$ (B17) should have data in them.

B14 is a peak voltage detector which continuously compares the data from register B3 at input 50 with that from register B5 at input 52. While input 50 is greater than or equal to input 52 an enable signal is fed to register B5 so that the higher value (content of register B3) will be loaded into register B5 at the next clock cycle. Otherwise, the enable signal from peak detector B14 will not be active and the content of register B5 will not be changed at the next cycle. Thus the $V_{max}$ register B5 always contains the highest voltage level on record among all the registers.

A −dV detector B9 compares the contents of register B3, which is the newest being read in, with that from register B5 which holds the highest value, Once the content in register B3 is lower than that in register B5 by a predetermined value (e.g. 50 mV) and is detected by −dV detector B9, its Q output 56 will go "high".

Registers B6 and B17 contain the previous voltage data prior to the detection of the voltage drop. Their data is fed together with that from register B5 into a level detector B10. Only when all three data inputs are equal will the Q output 58 of level detector B10 go "high".

When both Q outputs from −dV detector B9 and level detector B10 are "high", detected by a gate B11, a n-bit shift register B12 is enabled. A "high" signal will be transferred to its $Q_0$ pin at the next clock pulse. This "high" signal will be transferred to the Q1 pin and the signal at the input of shift register B12 transferred to the $Q_0$ pin by a further clock pulse. Thus after n clock pulses from the moment both outputs from B9 and B10 go "high", the original "high" level should be transferred to the $Q_n$ pin. Thus it will take n successive verifications by detectors B9 and B10 to have all the Q pins of shift register B12 "high". This system can be used for re-validation of any possible −dV detection, the number of times depending on the number of outputs that the shift register can offer. Only when all Q pins of shift register B12 are "high" will output circuit B13 confirm the validity of the detection. It will output a "high" signal at output 62 to disable ultra-fast or fast charging at the external charger circuit Y2.

In the case of a false detection where the contents of the register B6 and B17 are not equal to the contents of the register B5, it is most likely that a value corresponding to the amplitude of a voltage "spike" has been stored in the register B5. When this situation arises the Q output of the −dV detector B9 will be "high" and the Q output of the level detector B10 will be "low". This will cause the output of an AND gate BB1 to go "high" because the AND gate BB1 has as one of its inputs the Q output of the −dV detector B9, and as its other input the Q output of the level detector B10 inverted through an inverter gate BB3. Hence through the OR gate BB2 the register B5 will be enabled regardless of the state of the peak detector B14. Therefore the contents of the register B3 will be clocked into the register B5, the false data in the register B5 will be clocked into the register B6, and the data in the register B6 will be clocked into the register B17. The next clock pulse or cycle will result in another false detection, as the false data is now in register B6, and result in the false data being clocked into register B17. Thus on the next clock pulse or cycle a further false detection will occur but the false data will be erased from register B17 and the circuit of FIG. 7 can resume further measurement. It can be seen that in the event of the Q outputs of the −dV comparator B9 and the level detector B10 being high the output of the AND gate BB1 is low and the peak detector B14 either enables or disables the register B5 through the OR gate BB2.

All readings in storage are updated during every battery voltage measurement in an ongoing process no matter whether there is any −dV detection or not. All measurements and re-checking are done without any interruption to charging and within a very short time frame (a few seconds) thus giving very quick response to the monitoring and avoiding overcharging, without any compromise to the accuracy. Also minimum filtering is needed, thus saving cost.

The −dV detection circuit described above with reference to FIG. 7 employs a detection method that makes use of the fact that the battery voltage changes very gradually, unlike switching noises which are in the range of hundreds of kHz. By maintaining measurements before the moment when −dV is suspected to occur, and also taking measurements after that moment, it is possible to filter out the switching noises and only act on genuine drops in voltage.

Figure 8A:
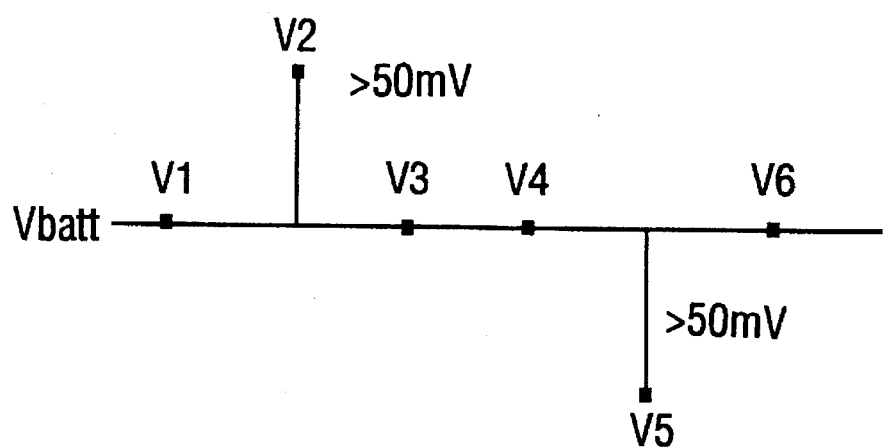
FIGS. 8a and 8b illustrate how the –dV detects and overcomes the problem of noise spikes.

Referring to FIG. 8a, if the amplitude at V3 is lower than that at V2 by more than the threshold (e.g. 50 mV), the reading at V1 is compared to that at V2. If amplitudes at V1 and V2 are not the same, then the detection is rejected as noise, as the voltages at V1 and V2 are not expected to differ due to the short time duration between measurements (typically one second interval).

If a voltage drop of more than 50 mV (−dV detection threshold) is detected from V4 to V5, the voltage at V6 is taken and compared to that at V4. If it is not consistent with the earlier voltage drop (from V4 to V5), the detection is ignored for the same reason.

Figure 8B:
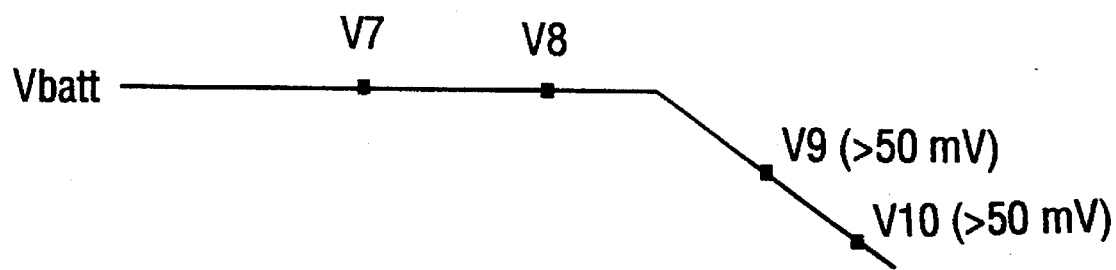

Only a genuine voltage drop of more than 50 mV like that shown in FIG. 8b (from V8 to V9) will be treated as a true −dV detection, as V7 and V8 have the same amplitude and V10 has a level which is more than 50 mV less than that at V8.

FIGS. 9a, 9b and 9c illustrate the concept of the power sharing technique used by the power sharing detector M2, when a computer is connected to the output AO. The method used in the invention for power sharing detects the loading condition by looking at the voltage of the auxiliary output AO which is supplied to the computer.

FIG. 9a shows the transition from computer "off" condition to computer "on" condition (normal load to overload condition), represented by a logic transition from "low" to "high" at time $t_2$.

FIG. 9b shows the transitions of a voltage representing the auxiliary output power available on line AO starting from a point to at which the charger is switched on but is not yet charging and the auxiliary output is unloaded (i.e. the computer is switched off). At this point the voltage representing the auxiliary output power available on line AO will be VA. Subsequently ultra-fast charging will begin. It should be noted that charging always commences in ultra-fast mode from reset, as will be further described hereinbelow with reference to FIG. 10. When ultra-fast charging begins the voltage representing the auxiliary output power available on line AO will drop from VA to VB as shown in FIG. 9b at time $t_1$. At point $t_2$ shown in FIG. 9a, the computer is turned on thereby presenting a load at the auxiliary output. Consequently the voltage representing the auxiliary output power available on line AO will drop still further to a voltage VC, as illustrated in FIG. 9b, indicating an overload condition. This overload is detected and charging is switched from ultra-fast mode to fast-mode, resulting in the voltage representing the auxiliary output power available on line AO rising to a voltage of VD, as shown in FIG. 9b. The technique used to detect this overload condition will be described in detail with reference to FIG. 10.

FIG. 9c shows the transitions of the voltage representing the auxiliary output power available on line 40 starting from a point $t_o$ at which the charger is switched on but is not yet charging and the auxiliary output is already loaded (i.e. the computer is switched on and being powered from its battery supply). At this point the voltage representing the auxiliary output power available on line AO will be VAA. Because the auxiliary output is already loaded the voltage VAA in FIG. 9c will be much lower than the voltage VA in FIG. 9b. Subsequently ultra-fast charging will begin and the voltage representing the auxiliary output power available on line AO will drop to a level VBB, as shown in FIG. 9c at $t'_1$, indicating an overload. This overload is detected and charging is switched from ultra-fast mode to fast mode, resulting in the auxiliary output voltage representing the auxiliary output power available on line AO rising to a voltage VDD at time $t'_2$, as seen in FIG. 9c. It can therefore be seen that the overload detection circuit is required to be able to detect a large voltage drop from a voltage VA to voltage VC in the situation of FIG. 9b, and also a small voltage drop from voltage VAA to voltage VBB in the situation of FIG. 9c. The technique for doing this is discussed with reference to FIG. 10.

Thus the power converter Y1 can be allowed to operate up to its maximum capacity (that is 35 W) with both ultra-fast charging and computer operation therefore enabling optimum converter usage and at the same time providing overload protection for the ac/dc power converter. Another advantage is that by detecting the auxiliary output level, the charger monitor is not limited to be located at any particular place, thereby providing extra flexibility in design.

Figure 10:
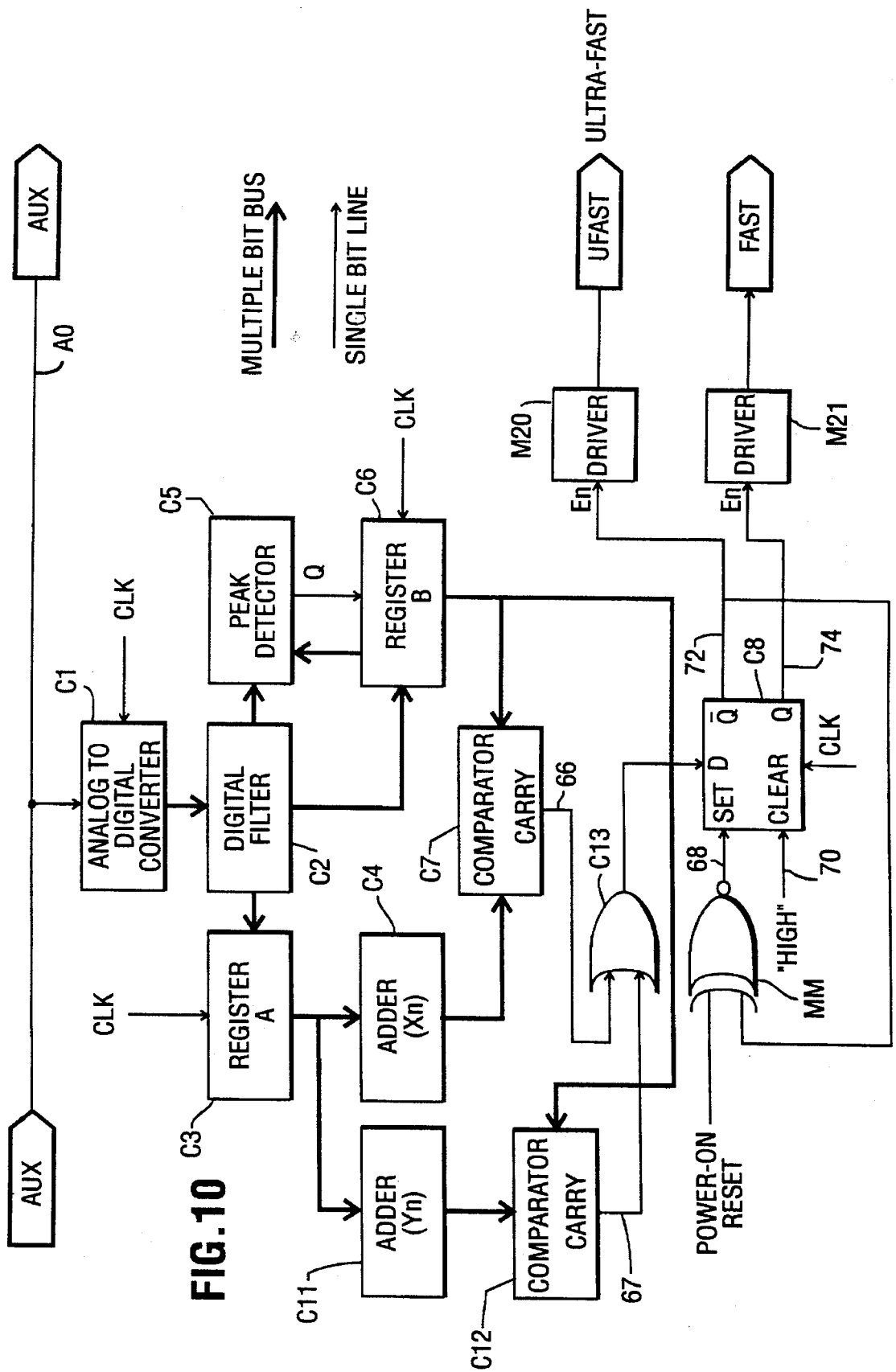
FIG. 10 is a circuit diagram of a power sharing detector; and and filter M3, can determine whether a battery is present at the $V_{batt}$ terminal or not. This is because the Qc output 1 of the constant current charger Y2 in FIG. 1 assumes a preset voltage value when the battery Y4 is not connected, which is distinctively higher than the maximum voltage that the battery can go in its fully charged state. Thus if the battery presence detector M15 detects a value nearer to the preset output level of the constant current charger Y2 it will interpret that the battery is not present and set the flip-flop M17 through the gate M16, by having a "high" level at its Q output 24.

FIG. 10 illustrates one implementation of the circuit M2 for performing the power sharing technique.

The auxiliary output level AO is read by an analogue-to-digital converter C1 through the Aux terminal. The voltage on the line AO is sampled at the frequency of the clock signal clk, which forms an input to the analogue to digital converter C1. The converter C1 converts the voltage on the line AO indicative of the power available on the line AO to 8-bits of digital data representing that voltage and supplies it to a digital filter C2. This filtered voltage data is then stored in an 'A' register C3, under the control of the clock signal clk and then added to a pre-determined value, $X_n$ in an adder C4. $X_n$ is decided by how much of a voltage drop is allowed before being interpreted as overload in the situation where the auxiliary output is not loaded when the charger is first switched on, as described with reference to FIG. 9b and is equal to the value VDROP1. The sum is then fed to a comparator C7.

The same data from the 'A' register C3 is fed into another adder C11 to be added to another predetermined value, Yn. Yn is determined by how small a voltage drop is allowed before being determined as overload in the situation where the auxiliary output is loaded when the charger is first switched on and is equal to the value VDROP2 of FIG. 9c. The output from the adder C11 is also fed into a comparator C12. This adder C11 and comparator C12 enable the overload condition described above with reference to FIG. 9c to be detected.

It should be noted that no comparison operations will be carried out until a fixed time after time $t_0$ at which the voltage VA of FIG. 9b or VAA of FIG. 9c has been recorded. This will mean that in the situation illustrated in FIG. 9b an overload condition of the type described in FIG. 9c is not incorrectly detected immediately after the voltage VA is stored. This fixed wait period will be determined by the frequency of the clock clk on the input to the register C3.

On the other hand the same filtered data from digital filter C2 is fed into a peak detector C5, and under the control of the clock signal clk into a 'B' register C6 for storage. The data in the register C6 is only updated if the peak detector C5 detects a higher value coming from the filter C2 as compared to the old value in the register C6. Therefore the register C6 always contains the highest voltage value recorded on the auxiliary output line AO since power-up.

The content of the register C6 is compared to the summed value from the adder C4 at the comparator C7. If the output of the register C6 is at any time after the initial wait period greater than the adder C4, then it is recognised as an overload condition as the voltage drop of the auxiliary output AO has attained the required value for charge mode conversion from ultra-fast mode to fast mode. Comparator C7 will output a signal from its carry pin 66 to the input D of a flip-flop C8 through an OR gate C13.

Similarly, the content of the register C6 is compared to the summed value from the adder C11 at the comparator C12. If the output of the register C6 is lower than the output of the adder C11 at any time after the initial wait period, then it is recognised as an overload condition as the voltage drop of the auxiliary output AO has fallen within the required range for charge mode conversion from ultra-fast mode to fast mode. Comparator C12 will output a signal from its carry pin 67 to the input D of the flip-flop C8 through the OR gate C13.

Therefore, if the voltage drop (VDROP2) from no-load to normal charging condition falls below $Y_n$, charging will be switched to the fast rate. If the voltage drop remains between $X_n$ and $Y_n$, charging will remain at the ultrafast rate and if the voltage drop (VDROP1) exceeds $X_n$ charging will also be reduced to the fast rate.

Flip-flop C8 is a positive-edged-triggered flip-flop with its set pin 68 connected to the power-on reset signal via an exclusive –NOR gate MM, clear pin 70 tied "high", $\overline{Q}$ output 72 connected to the enable pin of the driver M20 for ultra-fast mode charging and Q output 74 connected to the enable pin En of the driver M21 for fast mode charging. The $\overline{Q}$ output is also connected to a second input of the exclusive –NOR gate MM. When the power-on reset signal goes "high" the level available at the D input ("low", in the case of no overload) will be transferred to the Q output 74 and its complement to the $\overline{Q}$ output 72, enabling ultra-fast charging and disabling fast charging after the next positive going clock pulse. Ultra-fast charing can then only be enabled again by resetting the flip-flop C8 with a power-on reset signal.

The gates M18,M19 are omitted from FIG. 10 for the sake of clarity.

Upon detection of overload at the auxiliary output AO, a "high" signal (from comparator C7 or comparator C12 via OR gate C13) at the D input of flip-flop C8 will be transferred to driver M21 enabling fast mode charging and disabling ultra-fast mode charging.

The operation of the flip-flop C8 and the exclusive –NOR gate MM will now be explained more fully. Upon application of power to the circuit of FIG. 10, the power-on reset signal will initially be low. The state of output $\overline{Q}$ on line 72 is unknown at this stage. If it is high, the output of the exclusive –NOR gate MM will be low. Thus a low signal will appear at the set pin of flip-flop C8. At the next clock signal Q will assume a high state and $\overline{Q}$ will assume a low state.

When the power-on reset signal reaches a high level after the normal power-on delay, and in the case of no overload condition occurring, ultra-fast mode is entered and the Q output is high and the $\overline{Q}$ output is low. Any overload after this will switch the D input of the flip-flop C8 to a high level and the Q and $\overline{Q}$ outputs to high and low respectively. This will in turn make the output of the exclusive –NOR gate MM low. Thus the states of the Q and $\overline{Q}$ outputs will be locked to high and low respectively.

If the state of $\overline{Q}$ just after power-on (i.e. when the power-on reset signal is still low) is low, the output of the gate MM and therefore the set pin of C8 will be high. In this case the states of the Q and $\overline{Q}$ pins will depend on the state of the D input (depending on whether it is in normal or overload mode). If D is low, $\overline{Q}$ is high, and when the power-on reset signal reaches a high level, the set input will assume a high state. Thus the normal mode is entered. If there is an overload, D will be high, $\overline{Q}$ will be low, and when the power-on reset signal goes high, set will assume a low state due to the gate MM. Thus the overload mode is entered, and the flip-flop will only allow ultra-fast charging to recommence after a power-on reset signal is received.

A further situation may occur when, upon the charger being switched on, the auxiliary output is already loaded but loaded only lightly such that an overload condition does not occur. Referring to FIGS. 9b and 9c, the voltage representing the auxiliary output power available on line AO will have a value between VA and VAA. However, subsequently the auxiliary output may become more heavily loaded such that an overload condition occurs, but the voltage drop on the auxiliary output may not be large enough to exceed Xn but sufficiently large to exceed Yn, and hence the overload conditions in FIGS. 10b and 10c will not be detected. In this event, because the overload detector has failed to detect overload and reduce the power delivered to the battery charger, the power consumption of the battery charger and the computer will exceed the rated power which the switch mode power supply can actually supply. The switch mode power supply, which is a current mode converter, will then drop its output voltage drastically. As the output current continues to rise the output voltage will continue to drop, but the product of the output voltage and output current will remain approximately constant, so that the switch mode power supply generates constant power. As the output voltage of the switch mode power supply continues to decrease the threshold voltage Xn will eventually be exceeded and overload will finally be detected. In the worst case the output voltage of the switch mode power supply will not drop sufficiently for overload to be detected, and the switch mode power supply will remain in full load operation until the end of charging.

This method of measurement uses comparative data before and after overload, thus it will not depend on absolute values which may vary with different conditions, like poor voltage regulation of the power converter design or wide tolerances of components used in the measurement.

Figure 11:
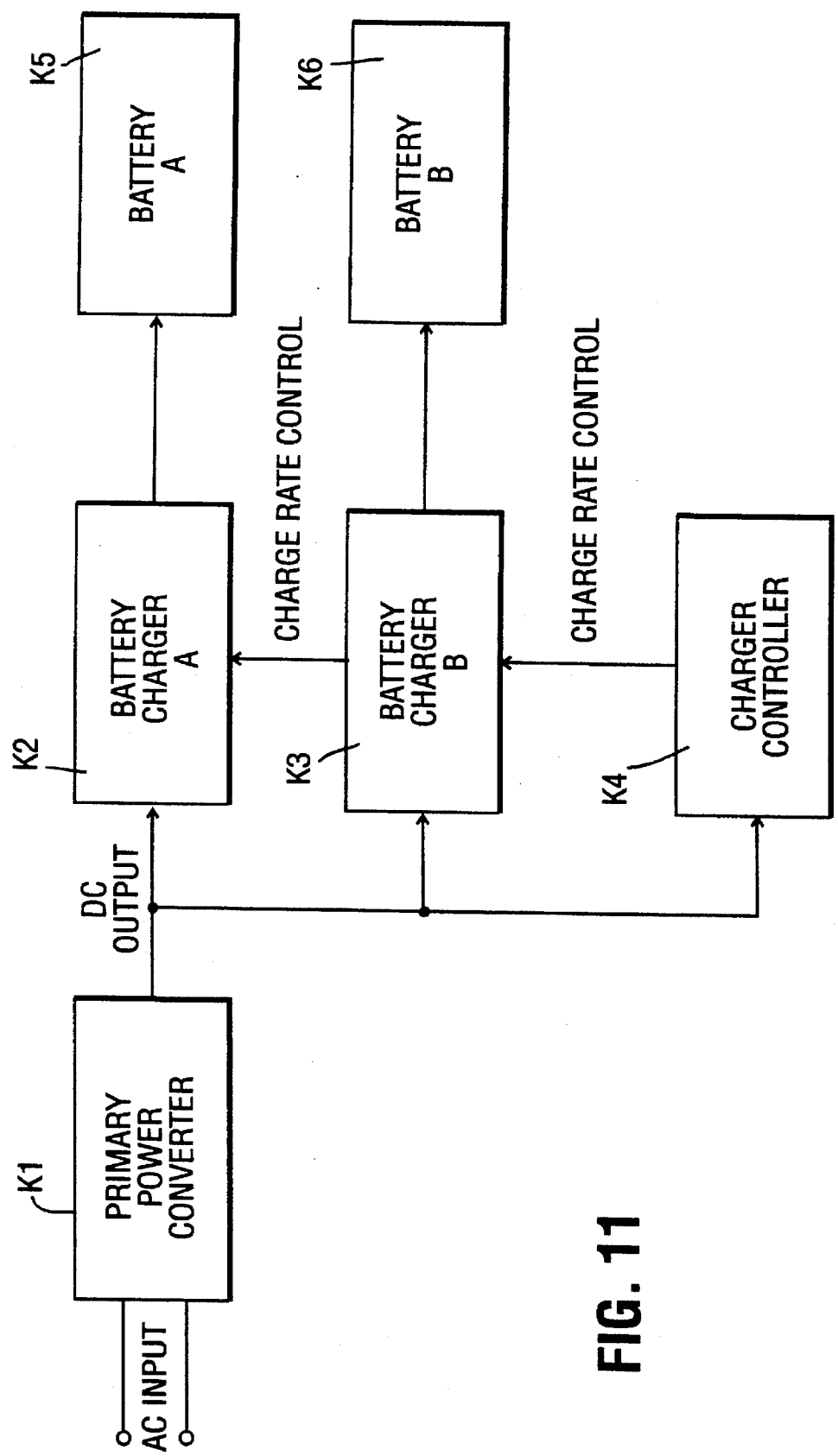

This power sharing detection concept is excellent not only for portable computer applications but is also useful when used in a double charger application, that is, a single charger providing concurrent charging for two batteries. This application can take the form as shown in the block diagram shown in FIG. 11. Circuits K1 and K4 are power converter and charger controller as before, while K2,K5 forms one charging channel and K3,K6 forms the other charging channel.

For example, if only one battery pack is needed to be charged (e.g. battery K5), charging can be done at a faster rate (by only K2) subject to the maximum capability of the power converter K1. If two sets of batteries are needed to be charged at the same time, an initial voltage decline of the DC output from K1 will be interpreted as an overload condition by K4 and charging will be switched to a slower rate for both batteries (the total power of which must not exceed the power rating of K1), thus making it possible to use the same power converter design.

What is claimed is:

1. A power sharing detector for use in a Circuit comprising a power supply connected to supply a battery charger and an auxiliary device, said circuit being such that the sum of the maximum power required by the battery charger and the maximum power required by the device exceeds the maximum power which the power supply can provide, the power sharing detector comprising a voltage detection circuit connected to receive a voltage representative of the power supplied to the auxiliary device and to determine therefrom a state of the auxiliary device; and means for selecting one of two charging rates for charging a battery in dependence on the voltage detected by the voltage detection circuit whereby a lower charging rate for charging the battery is selected when it is determined that said auxiliary device is in an on state so that the total power required by the auxiliary circuit and the battery charger does not exceed the maximum power which the power supply can provide.

2. The power sharing detector of claim 1 wherein the auxiliary device is a computer.

3. The power sharing detector of claim 1 wherein the auxiliary device is another battery charger.

4. The power sharing detector of claim 1 or 2 wherein the voltage detection circuit is operable to detect a change in the state of the auxiliary device while the battery charger is charging the battery by detecting a first voltage drop in said voltage.

5. The power sharing detector of claim 1 or 2 wherein the voltage detection circuit comprises means for storing said voltage and means for determining and storing a maximum detected voltage.

6. The power sharing detector of claim 5 wherein the voltage detection circuit includes means for adding a first predetermined value representing said first voltage drop to said stored voltage value to provide a resultant value; and means for comparing said resultant value with the maximum detected voltage.

7. The power sharing detector of claim 6 wherein the selecting means is controlled to select a lower one of said two charging rates when said resultant value exceeds said maximum detected voltage after a predetermined time period.

8. The power sharing detector of claim 1 or 2 wherein the voltage detection circuit is operable to detect commencement of battery charging when the auxiliary device is already consuming power by detecting a second voltage drop in said voltage.

9. The power sharing detector of claim 8 which includes means for adding a second predetermined value representing said second voltage drop to said stored voltage value to provide a resultant value; and means for comparing said resultant value with the maximum detected voltage.

10. The power sharing detector of claim 9 wherein the selecting means is controlled to select a lower one of said two charging rates when said resultant value is less than said maximum detected voltage after a predetermined time.

11. A power sharing detector for use in a circuit comprising a power supply connected to supply a battery charger and an auxiliary device, the power sharing detector comprising;

voltage detection circuit connected to receive a voltage representative of the power supplied to the auxiliary device and to determine therefrom a state of the auxiliary device, said voltage detection circuit comprising means for storing said voltage and means for determining and storing a maximum detected voltage; and means for selecting one of two charging rates for charging a battery in dependence on the voltage detected by the voltage detection circuit.

12. A power sharing detector as claimed in claim 11, wherein the voltage detection circuit includes means for adding a first predetermined value representing said first voltage drop to said stored voltage value to provide a resultant value; and means for comparing the resultant value with the maximum detected voltage.

13. A power sharing detector as claimed in claim 12, wherein the selecting means is controlled to select a lower one of said two charging rates when said resultant value exceeds a said maximum detected voltage after a predetermined time period.

14. A power sharing detector for use in a circuit comprising a power supply connected to supply a battery charger and an auxiliary device, the power sharing detector comprising:

a voltage detection circuit connected to receive a voltage representative of the power supplied to the auxiliary device and to determine therefrom a state of the auxiliary device, wherein the voltage detection circuit is operable to detect commencement of battery charging when the auxiliary device is already consuming power by detecting a second voltage drop in said voltage; and means for selecting one of two charging rates for charging a battery in dependence on the voltage detected by the voltage detection circuit.

15. The voltage detector of claim 14 which includes means for adding a second predetermined value representing said second voltage drop to said stored voltage value to provide a resultant value; and means for comparing said resultant value with a maximum detected voltage.

16. The power sharing detector of claim 15, wherein the selecting means is controlled to select a lower one of said two charging rates when said resultant value is less than said maximum detected voltage after a predetermined time.

17. A power sharing circuit comprising means for coupling a power supply, a battery charger and an auxiliary device to said power sharing circuit, said power supply being arranged to provide power to both said battery charger and said auxiliary device, the battery charger and the auxiliary device being arranged in parallel, said power sharing circuit further comprising a voltage detection circuit connected to receive a voltage representative of the power supplied to the auxiliary device and to determine therefrom a state of the auxiliary device; and means for selecting one of two charging rates for charging a battery in dependence on the voltage detected by the voltage detection circuit, wherein if it is detected that the auxiliary device is on, then the battery charger is charged at a lower rate and if it is detected that the auxiliary device is off, then the battery is chargeable at a higher rate.

* * * * *

United States Patent [19]

Honda et al.

[11] Patent Number: 5,583,418

[45] Date of Patent: Dec. 10, 1996

[54] BATTERY CHARGING STATION FOR ELECTRIC VEHICLES AND ELECTRIC VEHICLE USABLE THEREWITH

[75] Inventors: Satoshi Honda; Kenji Tamaki; Shoji Motodate; Yoshihiro Nakazawa; Kouichi Sugioka; Yoshinori Mita; Masao Ogawa, all of Saitama, Japan

[73] Assignee: Honda Giken Kogyo Kabushiki Kaisha, Tokyo, Japan

[21] Appl. No.: 214,752

[22] Filed: Mar. 18, 1994

Related U.S. Application Data

[62] Division of Ser. No. 891,948, Jun. 1, 1992, abandoned.

[30] Foreign Application Priority Data

| May 31, 1991 | [JP] | Japan | 3-155955 |
| Aug. 22, 1991 | [JP] | Japan | 3-233788 |
| Sep. 17, 1991 | [JP] | Japan | 3-262524 |

[51] Int. Cl.$^6$ .................................................. H02J 7/04
[52] U.S. Cl. ........................... 320/43; 320/2; 320/31
[58] Field of Search .......................... 320/2, 21, 31, 320/32, 43, 44, 39, 40

[56] References Cited

U.S. PATENT DOCUMENTS

| 3,773,131 | 11/1973 | Jaulmes | 180/34 |
| 4,216,839 | 8/1980 | Gould et al. | 180/65 R |
| 4,309,644 | 1/1982 | Reimers et al. | 320/2 X |
| 4,347,472 | 8/1982 | Lemelson | 320/2 |
| 4,406,342 | 9/1983 | Lacroix | 180/220 |
| 4,498,440 | 8/1984 | Evjen | 429/8 |
| 4,522,898 | 6/1985 | Esrom | 429/120 |
| 4,532,418 | 7/1985 | Messe et al. | 235/381 |
| 4,709,202 | 11/1987 | Koenck et al. | 320/43 |
| 4,800,328 | 1/1989 | Bolger et al. | 320/2 |
| 4,885,523 | 12/1989 | Koenck | 320/20 |
| 4,897,322 | 1/1990 | Jessen | 429/62 |
| 5,015,545 | 5/1991 | Brooks | 429/99 |
| 5,049,802 | 9/1991 | Mintus et al. | 320/2 |
| 5,082,075 | 1/1992 | Karolek et al. | 180/68.2 |
| 5,157,319 | 10/1992 | Klontz et al. | 320/2 |
| 5,202,617 | 4/1993 | Nor | 320/2 |

Primary Examiner—Robert Nappi

[57] ABSTRACT

An electric vehicle includes a wet type secondary battery wherein a battery housing is provided with electrode plates being operatively positioned within the battery housing. Connector terminals are operatively connected to respective electrode plates. The electrode plates are disposed in a horizontal plane when the battery housing is mounted relative to electric vehicle. A step floor is provided on the electric vehicle and operatively positioned relative to a lower portion of the electric vehicle wherein the battery housing is disposed below the step floor. A charging station is provided for charging the battery.

11 Claims, 46 Drawing Sheets

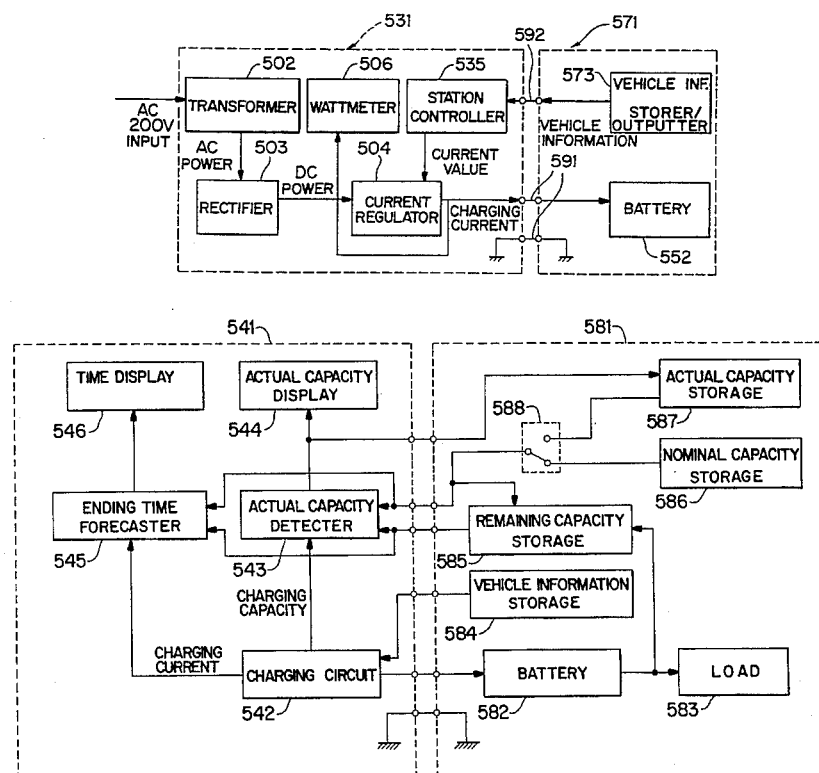

UNITED STATES PATENT AND TRADEMARK OFFICE
CERTIFICATE OF CORRECTION

| | |
|---|---|
| PATENT NO. | : 5,583,417 |
| APPLICATION NO. | : 08/191001 |
| DATED | : December 10, 1996 |
| INVENTOR(S) | : Tang K. Yuen |

It is certified that error appears in the above-identified patent and that said Letters Patent is hereby corrected as shown below:

Column 12, line 54, "charing" should be --charging--

Column 14, line 17, "Circuit" should be --circuit--

Signed and Sealed this

Twenty-first Day of August, 2007

JON W. DUDAS
*Director of the United States Patent and Trademark Office*